US008612036B2

(12) United States Patent
Yamamura

(10) Patent No.: US 8,612,036 B2
(45) Date of Patent: Dec. 17, 2013

(54) PORTABLE TERMINAL, PAIRING SYSTEM AND PAIRING METHOD

(75) Inventor: Toshiki Yamamura, Osaka (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 13/166,413

(22) Filed: Jun. 22, 2011

(65) Prior Publication Data

US 2012/0245722 A1 Sep. 27, 2012

(30) Foreign Application Priority Data

Mar. 22, 2011 (JP) ................................. 2011-062191

(51) Int. Cl.
G06F 17/00 (2006.01)
(52) U.S. Cl.
USPC ........... 700/94; 725/54; 709/227; 340/286.01
(58) Field of Classification Search
None
See application file for complete search history.

(56) References Cited

U.S. PATENT DOCUMENTS

| 2005/0094838 | A1 | 5/2005 | Tomoda et al. | |
|---|---|---|---|---|
| 2006/0085579 | A1* | 4/2006 | Sato ................................ | 710/73 |
| 2010/0052870 | A1* | 3/2010 | King ........................ | 340/286.02 |
| 2010/0053169 | A1 | 3/2010 | Cook | |
| 2010/0110837 | A1 | 5/2010 | Jung et al. | |
| 2010/0119208 | A1* | 5/2010 | Davis et al. ...................... | 386/83 |
| 2010/0227549 | A1* | 9/2010 | Kozlay .......................... | 455/26.1 |
| 2011/0041154 | A1* | 2/2011 | Olson ............................. | 725/54 |

FOREIGN PATENT DOCUMENTS

| JP | 2007-516123 | 6/2001 |
|---|---|---|
| JP | 2005-136871 | 5/2005 |
| JP | 2006-115196 | 4/2006 |
| JP | 2009-300537 | 12/2009 |
| JP | 2010-74472 | 4/2010 |
| JP | 2011-35722 | 2/2011 |
| WO | WO 2004/103773 | 12/2004 |

* cited by examiner

Primary Examiner — Andrew C Flanders
Assistant Examiner — David Siegel
(74) Attorney, Agent, or Firm — Hamre, Schumann, Mueller & Larson, P.C.

(57) ABSTRACT

When pairing an AV device with a controller for linking to and controlling the AV device, it was necessary for the user operating the controller to select an AV device near the user in accordance with the position of the user. A controller 2 specifies a nearby device based on audio characteristic information (an audio fingerprint) generated from audio obtained by an audio input portion (microphone) or content information specified from such audio characteristic information, and audio characteristic information of devices obtained with a communication portion or content information specified from such audio characteristic information, to carry out the pairing.

16 Claims, 15 Drawing Sheets

PORTABLE TERMINAL, PAIRING SYSTEM AND PAIRING METHOD

BACKGROUND OF THE INVENTION

1. Field of the Invention

The disclosure of the present application relates to a method for pairing an AV device connected through a network with a controller linked to the AV device or controlling the AV device. Moreover, the disclosure of the present application relates to a pairing system that can execute a pairing process. The disclosure of the present application relates to a portable terminal included in a pairing system.

2. Description of Related Art

Technology has become widespread, in which AV (audio-visual) devices for home use are connected to each other on a network, with the AV devices sharing content and controlling other AV devices. For example, there is a system, in which content of a digital video recorder (DVR) is reproduced and played on a reproducing device, such as a digital television (DTV), that has a so-called "rendering" function, via a controller. In such a system, title information or the like of the content of the DVR may be displayed on a controller that is operated by a user, where the user may select the content to be reproduced at hand, and the content is reproduced on a DTV, thus realizing the operation of a so-called "hand-held operation".

Referring to FIGS. 14 and 15, the following is an explanation of a technology, in which content on a server device is reproduced on a reproducing device via a controller.

As shown in FIG. 14, a controller 102, a reproducing device 103, and a server device 104 are connected through a cable 107. FIG. 15 shows a communication sequence when, in this configuration, the content on the server device 104 is generated on the reproducing device 103 via the controller 102.

First of all, the controller 102 sends to the reproducing device 103 a request in order to search reproducing devices 103 connected to the network (S1401). Having received a response from the reproducing device 103 (S1402), the controller 102 sends to the reproducing device 103 a request in order to obtain detailed information on the detected reproducing device 103 (S1403). Having received the detailed information from the reproducing device 103 (S1404), the controller 102 next sends to the server device 104 a search request for searching the server device 104 connected to the network (S1405). Having received a response from the server device 104 (S1406), the controller 102 sends to the detected server device 104 a request in order to obtain detailed information on the server device 104 (S1407), and receives a response from the server device 104 (S1408).

After the controller 102 has detected the reproducing device 103 and the server device 104 connected to the network, it decides on the server device 104 for requesting and obtaining content information, and the reproducing device 103 for reproducing the content (S1409). Next, the controller 102 sends a request to obtain content information to the server device 104 (S1410). After obtaining content information in response (S1411) to this request from the server device 104, the controller 102 displays the content information, such as the title, in a display portion (not shown in the drawings) of the controller. The user operating the controller 102 selects the content to be reproduced by operating an operation input portion, not shown in the drawings, based on the content information displayed in the display portion of the controller 102 (S1412). When the content to be reproduced has been selected by the user, the controller 102 sends a content reproducing request indicating a location and an indicator of the content, to the reproducing device 103 (S1413). Having received the content reproducing request, the reproducing device 103 sends back a response (S1414), and sends a request to obtain content to the server device 104 where the content is located, as stated in the request (S1415). The server device 104 sends the content to the reproducing device 103 as a response to the request to obtain content sent from the reproducing device 103 (S1416). Having received the content sent from the server device 104, the reproducing device 103 displays and reproduces the content (S1417).

With the configuration shown in FIGS. 14 and 15 it is possible to reproduce the content of a server device detected with a controller with a reproducing device detected by the controller. On the other hand, if the technology shown in FIGS. 14 and 15 is used at home, then it is conceivable that a plurality of digital televisions serving as reproducing devices are set up in the living room, the bedroom, the children's room, and so on. Moreover, there are cases conceivable, in which the controller is a mobile device and can be freely moved around the home and used. Furthermore, it is conceivable that the reproducing device, the server device and the controller in the home are connected to a network either by wire or wirelessly. If the user uses the controller in the living room, then in most cases, the content is reproduced on a reproducing device located in the living room. And if the user uses the controller in the bedroom, then in most cases, the content is reproduced on a reproducing device located in the bedroom. However, with the conventional technology, the controller may detect a plurality of reproducing devices that are connected to the network. Therefore, a user who freely moves a controller around and uses it, must select, in the living room, the reproducing device located in the living room, and in the bedroom, the reproducing device located in the bedroom, by selecting them by manual operation from a plurality of reproducing devices detected by the controller, requiring a troublesome operation.

To address this problem, JP 2006-115196A realizes pairing with a nearby device without selecting the device by the user, using two communication portions, operating by infrared and by radio (wirelessly). With the configuration disclosed in JP 2006-115196A, in order to realize pairing with a nearby device, two communication portions are necessary, and there was the problem that the devices became large and costly.

Moreover, to play broadcasting content in the US, ordinarily, a set-top box (STB) for cable television or satellite broadcasts is connected to an external input terminal of the DTV. The tuner of the DTV is not used. Therefore, the DTV may not know the content that is displayed on it. Thus, there is the problem that it cannot notify the controller of that content.

SUMMARY OF THE INVENTION

In view of the above-described problems, it is an object of the disclosure of the present application to provide a controller and a pairing system, with which, depending on the position of the controller, the device that has the desired capability and is closest, such as a reproducing device, can be automatically selected, and the reproducing device as well as the content information that is played on the device to be paired can be specified.

A pairing system disclosed in the present application includes a content identification server that outputs content information in response to an input of audio fingerprint information; a plurality of devices capable of sending audio fingerprint information of audio that can be output from the devices; and a portable terminal. The portable terminal includes an audio input portion into which audio can be input from outside; an audio fingerprint information generation portion that generates audio fingerprint information of audio that has been input into the audio input portion; a communication portion that, upon sending to the content identification server the audio fingerprint information generated by the audio fingerprint information generation portion, receives first content information, and upon receiving audio fingerprint information from each of the plurality of devices, and send the received audio fingerprint information to the content identification server, receives content information corresponding to the respective audio fingerprint information received from the plurality of devices; and a pairing device deciding portion that establishes a pairing with a device that has sent audio fingerprint information corresponding to content information matching the first content information, out of the received content information.

A pairing system disclosed in the present application includes a content identification server that outputs content information in response to an input of audio fingerprint information; a plurality of devices capable of sending content information of content that is currently being played; and a portable terminal. The portable terminal includes an audio input portion into which audio can be input from outside; an audio fingerprint information generation portion that generates audio fingerprint information of audio that has been input into the audio input portion; a communication portion that, upon sending to the content identification server the audio fingerprint information generated by the audio fingerprint information generation portion, receives first content information, and receives content information corresponding to the respective audio fingerprint information received from the plurality of devices; and a pairing device deciding portion that establishes a pairing with a device that has sent content information matching the first content information, out of the received content information.

A pairing system disclosed in the present application includes a content identification server; a plurality of devices capable of sending, to the content identification server, audio fingerprint information of audio that can be output from the devices; and a portable terminal. The portable terminal includes an audio input portion into which audio can be input from outside; an audio fingerprint information generation portion that generates audio fingerprint information of audio that has been input into the audio input portion; and a communication portion that sends to the content identification server the audio fingerprint information generated by the audio fingerprint information generation portion. The content identification server includes a subordinate communication portion that receives the audio fingerprint information sent by the communication portion; a content identification portion that outputs content information corresponding to the audio fingerprint information received by the subordinate communication portion; and a subordinate pairing device deciding portion that establishes a pairing between the portable terminal and the device that has sent audio fingerprint information corresponding to content information matching the content information corresponding to the audio fingerprint information received from the portable terminal.

A pairing system disclosed in the present application includes a content identification server that outputs content information in response to an input of audio fingerprint information; a plurality of devices capable of sending audio fingerprint information of audio that can be input into the devices; and a portable terminal. The portable terminal includes an audio output portion capable of outputting audio to the outside; an audio fingerprint information generation portion that generates audio fingerprint information of audio that has been output by the audio output portion; a communication portion that, upon sending to the content identification server the audio fingerprint information generated by the audio fingerprint information generation portion, receives first content information, and upon receiving audio fingerprint information from each of the plurality of devices and sending the received audio fingerprint information to the content identification server, receives content information corresponding to the respective audio fingerprint information received from the plurality of devices, and a pairing device deciding portion that establishes a pairing with a device that has sent audio fingerprint information corresponding to content information matching the first content information, out of the content information.

A pairing system disclosed in the present application includes a content identification server that outputs content information in response to an input of audio fingerprint information; a plurality of devices capable of sending content information corresponding to audio that can be input into the devices; and a portable terminal. The portable terminal includes an audio output portion capable of outputting audio to the outside; an audio fingerprint information generation portion that generates audio fingerprint information of audio that has been output by the audio output portion; a communication portion that, upon sending to the content identification server the audio fingerprint information generated by the audio fingerprint information generation portion, receives first content information, and receives content information corresponding to the respective audio fingerprint information received from the plurality of devices; and a pairing device deciding portion that establishes a pairing with a device that has sent content information matching the first content information, out of the content information.

A pairing system disclosed in the present application includes a content identification server; a plurality of devices capable of sending, to the content identification server, audio fingerprint information of audio that can be input into the devices; and a portable terminal. The portable terminal includes an audio output portion capable of outputting audio to the outside; an audio fingerprint information generation portion that generates audio fingerprint information of audio that has been output by the audio output portion; and a communication portion that sends to the content identification server the audio fingerprint information generated by the audio fingerprint information generation portion. The content identification server includes a subordinate communication portion that receives the audio fingerprint information; a content identification portion that outputs content information corresponding to the audio fingerprint information received by the subordinate communication portion; and a subordinate pairing device deciding portion that establishes a pairing between the portable terminal and the device that has sent audio fingerprint information corresponding to content information matching the content information corresponding to the audio fingerprint information received from the portable terminal.

A portable terminal disclosed in the present application can be connected to a content identification server that outputs content information in response to an input of audio fingerprint information and to a plurality of devices that are capable of sending audio fingerprint information of audio that can be output from the devices. The portable terminal includes an audio input portion into which audio can be input from outside; an audio fingerprint information generation portion that generates audio fingerprint information of audio that has been input into the audio input portion; a communication portion that, upon sending to the content identification server the audio fingerprint information generated by the audio fingerprint information generation portion, receives first content information, and upon receiving audio fingerprint information from each of the plurality of devices and sending the received audio fingerprint information to the content identification server, receives content information corresponding to the respective audio fingerprint information received from the plurality of devices; and a pairing device deciding portion that establishes a pairing with a device that has sent audio fingerprint information corresponding to content information matching the first content information, out of the received content information.

A portable terminal disclosed in the present application can be connected to a content identification server that outputs content information in response to an input of audio fingerprint information and to a plurality of devices capable of sending content information of content that is currently being played. The portable terminal includes an audio input portion into which audio can be input from outside; an audio fingerprint information generation portion that generates audio fingerprint information of audio that has been input into the audio input portion; a communication portion that, upon sending to the content identification server the audio fingerprint information generated by the audio fingerprint information generation portion, receives first content information, and receives content information corresponding to the respective audio fingerprint information received from the plurality of devices; and a pairing device deciding portion that establishes a pairing with a device that has sent content information matching the first content information, out of the received content information.

A portable terminal disclosed in the present application can be connected to a content identification server that outputs content information in response to an input of audio fingerprint information and to a plurality of devices that are capable of sending audio fingerprint information of audio that can be input into the devices. The portable terminal includes an audio output portion capable of outputting audio to the outside; an audio fingerprint information generation portion that generates audio fingerprint information of audio that has been output by the audio output portion; a communication portion that, upon sending to the content identification server the audio fingerprint information generated by the audio fingerprint information generation portion, receives first content information, and upon receiving audio fingerprint information from each of the plurality of devices and sending the received audio fingerprint information to the content identification server, receives content information corresponding to the respective audio fingerprint information received from the plurality of devices, and a pairing device deciding portion that establishes a pairing with a device that has sent audio fingerprint information corresponding to content information matching the first content information, out of the content information.

A portable terminal disclosed in the present application can be connected to a content identification server that outputs content information in response to an input of audio fingerprint information and to a plurality of devices capable of sending content information corresponding to content that can be input into the devices. The portable terminal includes an audio output portion capable of outputting audio to the outside; an audio fingerprint information generation portion that generates audio fingerprint information of audio that has been output by the audio output portion; a communication portion that, upon sending to the content identification server the audio fingerprint information generated by the audio fingerprint information generation portion, receives first content information, and receives content information corresponding to the respective audio fingerprint information received from the plurality of devices; and a pairing device deciding portion that establishes a pairing with a device that has sent content information matching the first content information, out of the content information.

With the disclosure of the present application, it is not necessary to select a reproducing device by a manual operation in accordance with the location where the user operates a portable controller, so that the operability can be improved.

Moreover, with the disclosure of the present application, it is possible to perform pairing with a nearby device by providing one communication portion and without providing two communication portions, so that it is possible make the system smaller and less expensive.

Moreover, with the disclosure of the present application, simultaneously to the pairing, it is possible to specify content information that is being played on the device to be paired; so that in a combination of a television receiver (one example of a reproducing device) with a tablet terminal (one example of a controller), it becomes possible to display on the tablet terminal information related to the content that is being played on the television receiver.

Moreover, with the disclosure of the present application, it becomes possible to pair a plurality of nearby portable terminals with each other.

DETAILED DESCRIPTION OF THE INVENTION

Embodiment 1

[1. System Configuration]

Referring to FIGS. 1 to 6, the following is an explanation of Embodiment 1 of the present invention.

Figure 1:
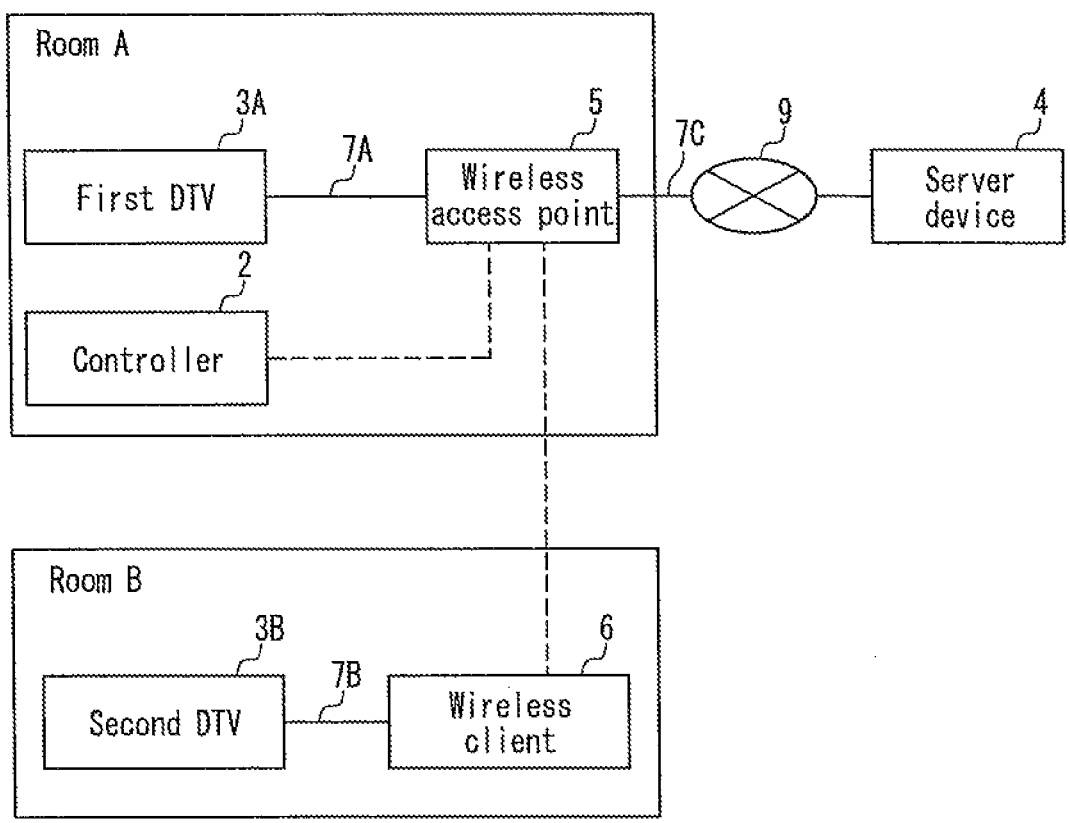
FIG. 1 is a diagram showing a configuration example of a pairing system according to Embodiment 1.

FIG. 1 is a block diagram showing the configuration of a case in which a pairing system according to Embodiment 1 is applied to a home having a plurality of rooms (room A and room B). It should be noted that in FIG. 1, connections by wiring are drawn with solid lines and wireless connections are drawn with broken lines.

The pairing system shown in FIG. 1 includes mainly a first digital television 3A (referred to as "first DTV 3A" below) and a second digital television 3B (referred to as "second DTV 3B" below), which are a plurality of reproducing devices, a controller 2, and a server device 4. The server device 4 is connected to the Internet 9.

The first DTV 3A and the second DTV 3B are capable of receiving digital broadcasts, for example. The first DTV 3A and the second DTV 3B can receive broadcast waves of the same channel, but they can also receive broadcast waves of different channels of a digital broadcast. The specific configuration of the first DTV 3A and the second DTV 3B is explained further below.

The controller 2 is a terminal on which various types of application programs can be installed and executed. The controller 2 is provided with a touch panel superimposed over a display panel, and can be realized with a tablet terminal with which it is possible to touch the touch panel with a stylus pen, for example, to perform various inputs. The specific configuration of the controller 2 is explained further below.

The pairing system shown in FIG. 1 includes a wireless access point 5 and a wireless client 6. The wireless access point 5 is connected by a network cable 7A to the first DTV 3A. The wireless access point 5 is connected by the wireless communication line to the wireless client 6. The wireless access point 5 is connected by a network cable 7C to the Internet 9. The wireless access point 5 has a wireless function as well as a network hub function. The wireless client 6 is connected by a network cable 7B to the second DTV 3B. The wireless client 6 is connected by the wireless communication line to the wireless access point 5. The wireless client 6 can carry out the exchange between a wired network and a wireless network. The wireless access point 5 and the wireless client 6 may also be omitted, if the first DTV 3A, the second DTV 3B and the controller 2 have functionality that is equivalent to this.

Since the controller 2 is a portable device, it can be arranged in either room A or in room B, but in FIG. 1, it is assumed that it is arranged in room A. The controller 2 arranged in room A is network-connected via a wireless communication line with the wireless access point 5.

The controller 2 in room A and the wireless client 6 constitute a wirelessly connected network with the wireless access point 5. That is to say, the controller 2 is connected to the same network as the first DTV 3A and the second DTV 3B and they constitute a LAN (Local Area Network).

The wireless access point 5 is connected to the Internet 9, and is in a state in which it can communicate with a server device 4 on the Internet 9. In this embodiment, the wireless access point 5 and the Internet 9 are wire-connected through a network cable 7C, but they may also be wirelessly connected using a mobile phone communication line or the like.

Figure 2:
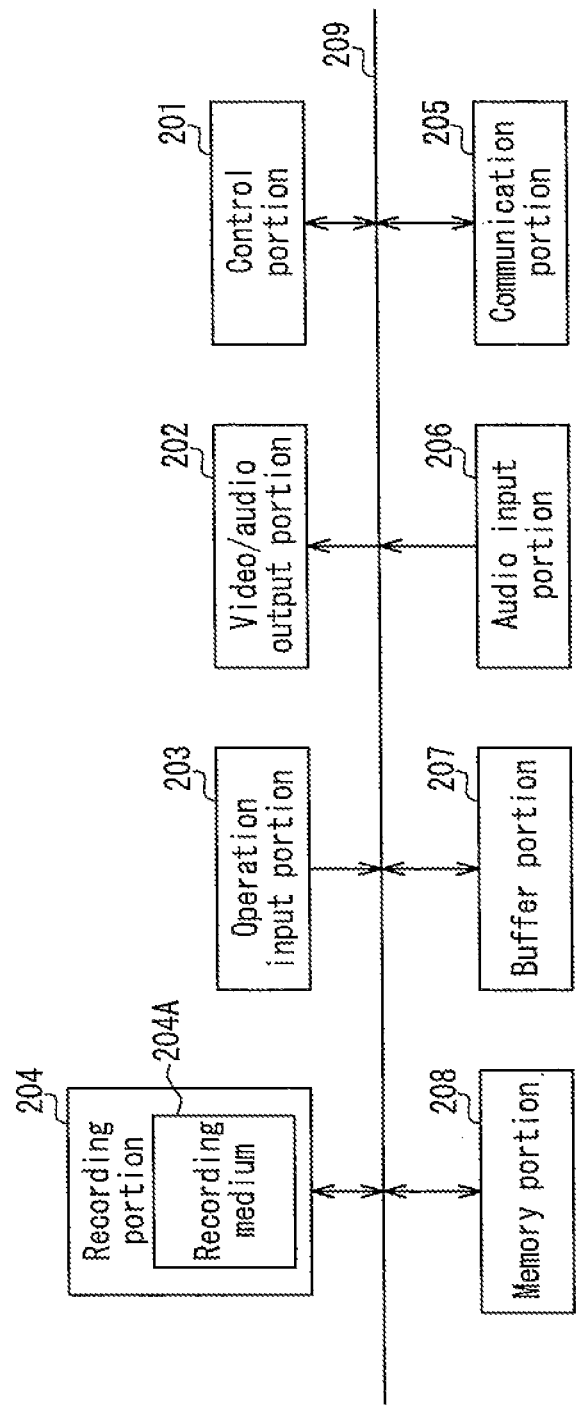
FIG. 2 is a block diagram showing a configuration example of a controller or portable terminal according to this embodiment.

FIG. 2 is a block diagram showing the configuration of the controller 2. The controller 2 includes a control portion 201, a video/audio output portion 202, an operation input portion 203, a recording portion 204, a communication portion 205, an audio input portion 206, a buffer portion 207, and a memory portion 208. The various portions included in the controller 2 are connected so that they can communicate with each other over a bus 209. The control portion 201 controls the overall device, and is configured by a CPU (Central Processing Unit). The video/audio output portion 202 is configured by a display panel capable of displaying video and a speaker or the like that is capable of outputting audio. The display panel of the video/audio output portion 202 may not only be capable of displaying video, but may also include a touch panel that detects that it has been touched by a user's finer, a stylus pen or the like, and outputs operation signals. In this case, the touch panel is included in the operation input portion 203. The operation input portion 203 receives user instructions and can be realized by operation buttons or a touch panel, for example. A recording medium 204A can be attached to and removed from the recording portion 204. Various kinds of data can be written onto the mounted recording medium 204A, and those various kinds of data can be read from the recording medium 204A. The communication portion 205, which is configured as a wireless communication circuit, can send various kinds of data to the wireless access point 5 (see FIG. 1), for example, and can receive various kinds of data that are sent from the wireless access point 5, for example. The audio input portion 206, which may be configured by a microphone, for example, can collect audio from the surroundings of the controller 2. The buffer portion 207 can temporarily store various kinds of data. The memory portion 208 can store programs or the like that are executed by the control portion 201.

When the user touches a menu displayed on the display panel of the video/audio output portion 202 with the touch panel of the operation input portion 203, then the operation input portion 203 sends an operation signal to the control portion 201. The control portion 201 executes predetermined processing corresponding to the operation signal sent from the operation input portion 203.

It should be noted that in the communication portion 205, a first communication portion that is capable of communicating with the server device 4 and a second communication portion that is capable of communicating with the first DTV 3A and the second DTV 3B may be provided independently. For example, the communication portion 205 may be constituted by including a first communication portion that can be connected to a mobile telephone communications network and a second communication portion that is capable of being connected to a wireless LAN. Alternatively, the communication portion 205 may be constituted by including a first communication portion that can be connected to a mobile telephone communication network and a second communication portion that is capable of communicating according to the Bluetooth™ standard.

Figure 3:
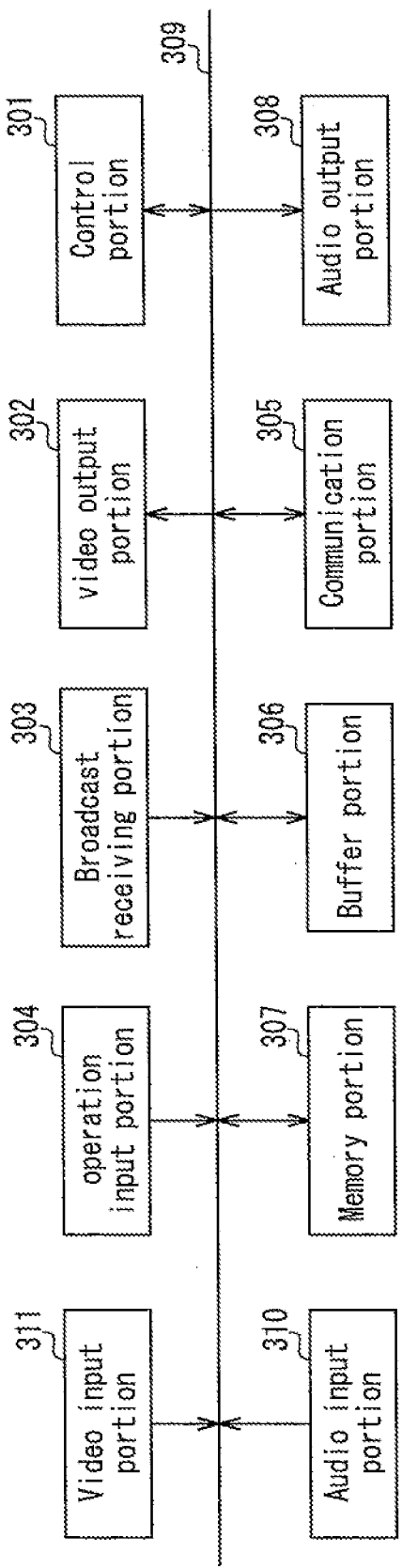
FIG. 3 is a block diagram showing a configuration example of a digital television (DTV) according to this embodiment.

FIG. 3 is a block diagram showing the configuration of the first DTV 3A. It should be noted that FIG. 3 shows the configuration of the first DTV 3A, but also the second DTV 3B has the same configuration. The first DTV 3A includes a control portion 301, a video output portion 302, a broadcast receiving portion 303, an operation input portion 304, a communication portion 305, a buffer portion 306, a memory portion 307, an audio output portion 308, a video input portion 311, and an audio input portion 310. The various elements included in the first DTV 3A and the second DTV 3B are connected such that they can communication with each other over the bus 309. The control portion 301 controls the overall device, and is configured by a CPU (Central Processing Unit). The video output portion 302 is configured by a display panel capable of displaying video. The broadcast receiving portion 303 can receive broadcast waves of digital broadcasts, for example. The broadcast receiving portion 303 includes an antenna, a tuner; a signal processing portion and so on. The operation input portion 304 receives instructions from the user, and can be realized by operation buttons, for example. The communication portion 305 includes a network terminal to which a network cable 7A or the like can be connected, and controls an operation of sending or receiving various kinds of data over the connected network cable 7A. The communication portion 305 can be connected to the Internet 9 via the wireless access point 5 shown in FIG. 1. The buffer portion 306 can temporarily store various kinds of data. The memory portion 307 can store programs or the like that are executed by the control portion 301. The audio output portion 308 is constituted by a speaker; for example, which converts audio signals that are output from the control portion 301 into audio and outputs them. The audio output portion 308 can output audio that is demodulated from broadcast waves of digital broadcasts received with the broadcast receiving portion 303, for example. The video input portion 311 and the audio input portion 310 can receive, for example, video/audio signals of an external device, such as a set-top box (STB) or the like.

The broadcast receiving portion 303 demodulates video signals and audio signals from the broadcast waves of the received digital broadcast. The video signals and audio signals demodulated with the broadcast receiving portion 303 are temporarily stored in the buffer portion 306. The control portion 301 performs a control to display, with the video output portion 302, video based on the video signals stored in the buffer portion 306. The video output portion 302 displays video based on the control with the control portion 301. Moreover, the control portion 301 performs a control to output, with the audio output portion 308, audio based on the audio signals stored in the buffer portion 306. The audio output portion 308 outputs audio based on the control with the control portion 301.

The communication portion 305 carries out communication processing with external devices (for example, the server device 4) network-connected over the network cables 7A and 7B (see FIG. 1). When displaying and reproducing the content sent from an external device (for example, the server device 4), the first DTV 3A and the second DTV 3B send a request to obtain content to the external device (for example, the server device 4) through the communication portion 305. After the first DTV 3A and the second DTV 3B have temporarily stored, in the buffer portion 306, the content received in response from the server device 4, it is displayed on the display panel of the video output portion 302.

Figure 4:
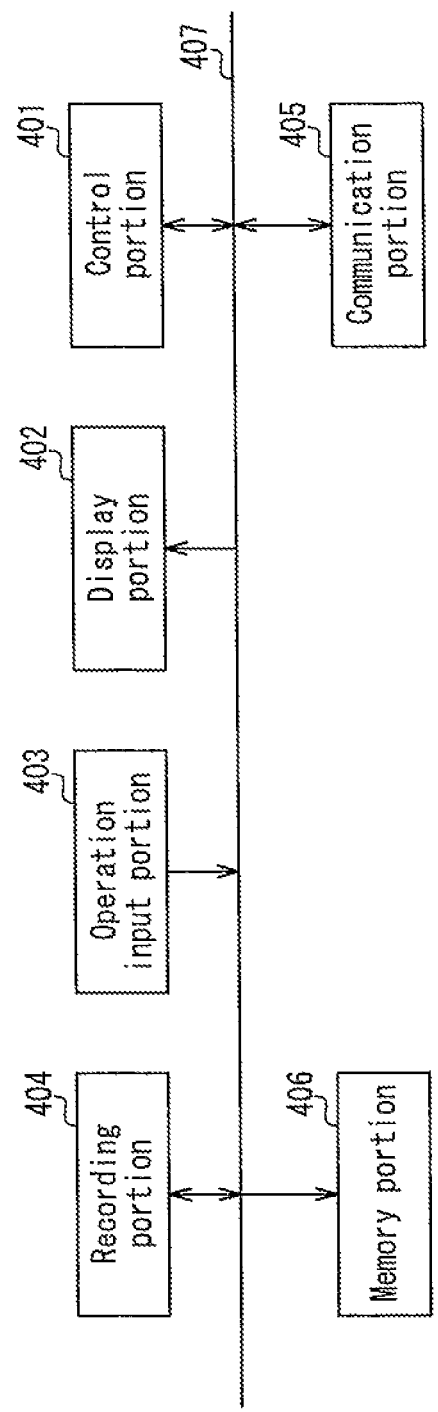
FIG. 4 is a block diagram showing a configuration example of a server device according to this embodiment.

FIG. 4 is a block diagram showing a configuration example of the server device 4 of this embodiment. As shown in FIG. 4, the server device 4 includes a control portion 401, a display portion 402, an operation input portion 403, a recording portion 404, a communication portion 405, and a memory portion 406. The control portion 401 can be realized by a CPU, for example, and can carry out various types of signal processing within the server device 4. The display portion 402 can display various kinds of video. The operation input portion 403 can receive input instructions from the user. The recording portion 404 can be realized by a hard disk, for example, and can record various kinds of data and information. The communication portion 405 can be connected to the Internet 9 (see FIG. 1).

[2. Communication Sequence]

Figure 5:
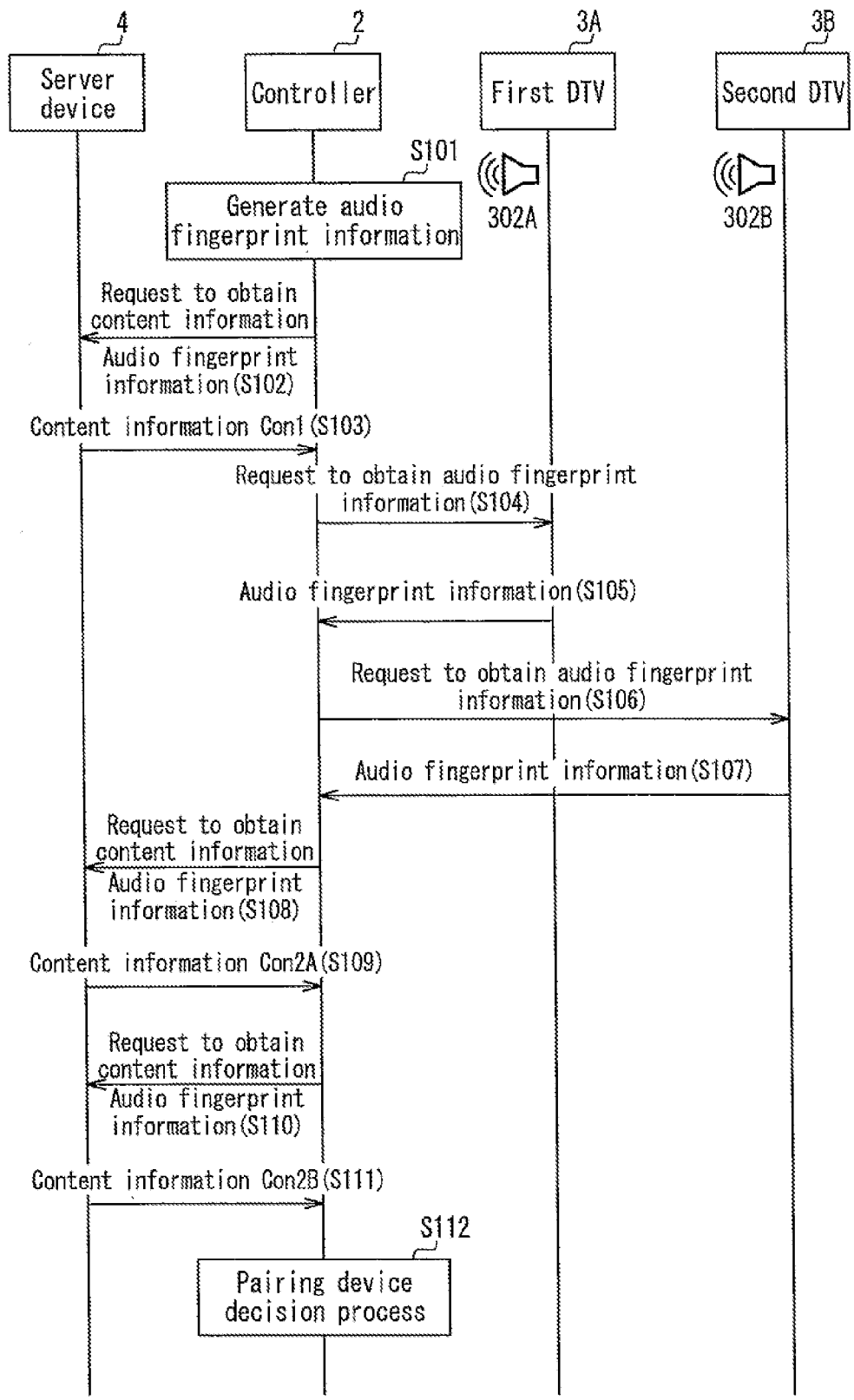
FIG. 5 is a diagram showing a communication sequence of a pairing system according to Embodiment 1.

FIG. 5 is a diagram illustrating the communication sequence of the pairing system of Embodiment 1.

Referring to FIG. 5, the following is an explanation of the communication sequence when deciding on a pairing device in accordance with the present embodiment.

When the controller 2 receives an instruction to start a predetermined application program from a user, then it executes a predetermined application program that is already installed on the controller 2, and sends to the wireless access point 5 a request for searching a DTV connected to the LAN. The wireless access point 5 sends the search request received from the controller 2 to the first DTV 3A, and sends it via the wireless client 6 to the second DTV 3B. The first DTV 3A and the second DTV 3B output a response signal as a response to the received search request. The response signal is sent via the wireless access point 5 to the controller 2. When the controller 2 receives the response signal, a request to obtain detailed information on the DTV detected based on this response signal is sent via the wireless access point 5 to the first DTV 3A and the second DTV 3B. In response to the received request to obtain detailed information, the first DTV 3A and the second DTV 3B send detailed information on themselves via the wireless access point 5 or the like to the controller 2. The controller 2 receives the detailed information sent from the first DTV 3A and the second DTV 3B. If a plurality of DTVs are connected to the network, then the controller 2 obtains the detailed information concerning each of these DTVs (in the present embodiment this is the first DTV 3A and the second DTV 3B).

Next, the controller 2 puts a microphone in its audio input portion 206 into a state in which it can collect audio. When it is in a state in which it can collect audio, the audio input portion 206 (microphone) obtains audio from the surroundings of the controller 2. The controller 2 generates audio characteristics information (audio fingerprint information) from the audio obtained by the audio input portion 206. More specifically, the controller 2 generates audio characteristics information (audio fingerprint information) corresponding to the DTV output audio included in the audio obtained by the audio input portion 206 (S101).

It should be noted that "audio characteristics information" and "audio fingerprint information" is information formed by extracting only characteristic elements from the audio waveform (frequency characteristics). Audio characteristics information and audio fingerprint information are different in name but are substantially the same information. In the following explanations, these kinds of information are referred to as "audio fingerprint information".

The controller 2 sends a request to obtain content information including the generated audio fingerprint information to the server device 4 (S102).

The server device 4 compares the audio fingerprint information contained in the received request to obtain content information with the audio fingerprint information contained in a content database of the server device itself, and extracts the content information corresponding to the request to obtain content information from the content database. Next, as a response to the request to obtain content information from the controller 2, the server device 4 sends the content information Con1 back to the controller 2 (S103).

Next, the controller 2 sends a request to obtain audio fingerprint information to the first DTV 3A and the second DTV 3B connected to the LAN (S104, S106).

When the first DTV 3A and the second DTV 3B receive the request to obtain audio fingerprint information, they generate audio fingerprint information from the audio signal that is output from the audio output portions 308 of the DTVs themselves. Next, in response to the request to obtain audio fingerprint information, the first DTV 3A and the second DTV 3B send the generated audio fingerprint information to the controller 2 (S105, S107).

When the controller 2 obtains the audio fingerprint information sent from the first DTV 3A and the second DTV 3B, it sends the request to obtain content information including the obtained audio fingerprint information to the server device 4 (S108, S110).

The server device 4 compares the audio fingerprint information included in the request to obtain content information with the audio fingerprint information included in the content database of the server device itself, and extracts, from the content database, the content information corresponding to the request to obtain content information. Next, in response to the request to obtain content information, the server device 4 sends the content information Con2A and Con2B back to the controller 2 (S109, S111).

Next, the controller 2 compares the content information Con1 with the content information Con2A and Con2B. The controller 2 carries out a pairing process with the DTV that has sent audio fingerprint information corresponding to the content information Con2A or Con2B matching the content information Con1 (S112).

In the case of this embodiment, the audio input portion 206 of the controller 2 obtains the audio that is output from the audio output portion 308 of the first DTV 3A, which is in the same room. That is to say, in the case of this embodiment, the controller 2 judges that the content information Con1 matches the content information Con2A. Consequently, the controller 2 is paired with the first DTV 3A, which has sent audio fingerprint information corresponding to the content information Con2A.

[3. Process Flow for Deciding the Reproducing Device]

Figure 6:
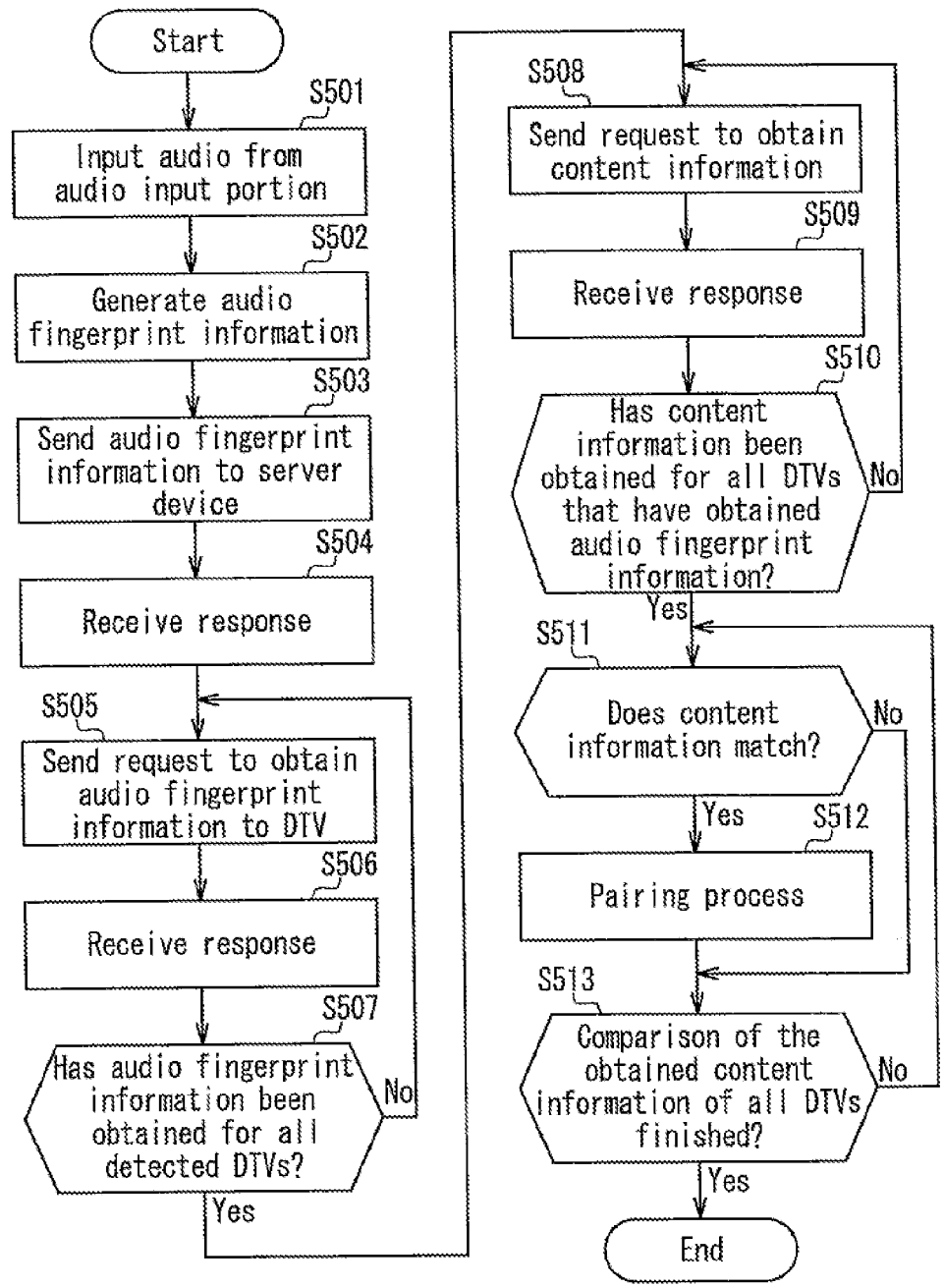
FIG. 6 is a diagram showing the processing flow of a controller according to Embodiment 1.

FIG. 6 shows the process flow when the controller 2 decides the pairing with a nearby DTV (for example the first DTV 3A), from among a plurality of DTVs connected to the network.

When the controller 2 receives from the user an instruction to activate a predetermined application, it executes a predetermined application program that is preinstalled on the controller, and sends to the wireless access point 5 a request for searching DTVs connected to the LAN. The wireless access point 5 sends the search request, which has been sent from the controller 2, to the first DTV 3A, and, via the wireless client 6, to the second DTV 3B. The first DTV 3A and the second DTV 3B generate a response signal in response to the received search request. The response signal is sent via the wireless access point 5, for example, to the controller 2. When the controller 2 receives the response signal, it sends a request for obtaining detailed information on the DTVs detected based on this response signal via the wireless access point 5, for example, to the first DTV 3A and the second DTV 3B. In response to the received request to obtain detailed information, the first DTV 3A and the second DTV 3B send detailed information about themselves via the wireless access point 5 to the controller 2. The controller 2 receives the detailed information sent from the first DTV 3A and the second DTV 3B. If a plurality of DTVs are connected to the network, then the controller 2 receives the detailed information from each of the DTVs (in the present embodiment, this is the first DTV 3A and the second DTV 3B).

The controller 2 puts the microphone of the audio input portion 206 into a state in which it can collect audio. When put into a state in which it can collect audio, the audio input portion 206 (microphone) obtains audio from the surroundings of the controller 2. More specifically, the audio input portion 206 can obtain audio that is output from either one or from both of the first DTV 3A and the second DTV 3B (S501).

The controller 2 generates audio fingerprint information from the audio obtained by the audio input portion 206. It should be noted that if the audio obtained by the audio input portion 206 includes the audio output from a plurality of DTVs, then the audio with the largest volume is selected to generate the audio fingerprint information (S502).

Next, the controller 2 sends the request to obtain content information including the generated audio fingerprint information to the server device 4 (S503). The controller 2 receives the response to the request to obtain content information from the server device 4 (S504).

Next, the controller 2 sends a request to obtain audio fingerprint information to the DTVs connected to the LAN (S505). The controller 2 receives the responses to the request to obtain audio fingerprint information from the DTVs (S506). The controller 2 obtains audio fingerprint information for all detected DTVs (S507).

After the controller 2 has obtained the audio fingerprint information of the first DTV 3A and the second DTV 3B, it sends a request to obtain the content information including the obtained audio fingerprint information to the server device 4 (S508). The controller 2 receives the response to the request to obtain the content information from the server device 4 (S509). The controller 2 obtains the corresponding audio fingerprint information for all DTVs that have obtained audio fingerprint information (S510).

Next, the controller 2 compares the content information Con1 corresponding to the audio fingerprint information generated from the audio that has been entered by its own audio input portion 206 with the content information Con2A and Con2B corresponding to the audio fingerprint information obtained from the first DTV 3A and the second DTV 3B connected to the LAN (S511). The controller 2 carries out pairing with the device that has sent audio fingerprint information corresponding to content information (Con2A or Con2B) matching the content information Con1 (S512). Thus, the controller 2 carries out pairing with a nearby DTV.

When the controller 2 has finished the process of comparing the obtained content information of all DTVs, the pairing process is finished (S513).

Through the above-described series of processes, the controller 2 is able to automatically select the nearest DTV from among the plurality of DTVs connected to the network. Consequently, depending on the position of the operated controller 2, the user does not need to select by hand the nearby DTV.

Here, "the nearest DTV" more precisely means the DTV that outputs the audio with the greatest volume among the audio output from the DTVs collected with the audio input portion 206 of the controller 2. For example, even when the first DTV 3A is placed in a position that is physically closest to the controller 2, if the volume of the audio output by the second DTV 3B, which is placed in another room, is extremely high, then the controller 2 may collect the audio output from the second DTV 3B. In this case, the controller 2 may judge that the second DTV 3B is "the closest DTV" However, ordinarily, there will be no large difference in the volume of the audio that is output by DTVs placed in a plurality of different rooms, so that "the closest DTV" is regarded in the present embodiment as the DTV at the position that is physically closest to the controller 2.

It should be noted that in the present embodiment, the controller 2 obtains the audio fingerprint information of the first DTV 3A and the second DTV 3B, and using the obtained audio fingerprint information, it obtains the content information corresponding to the audio fingerprint information from the server device 4, but there is no limitation to this.

Figure 7:
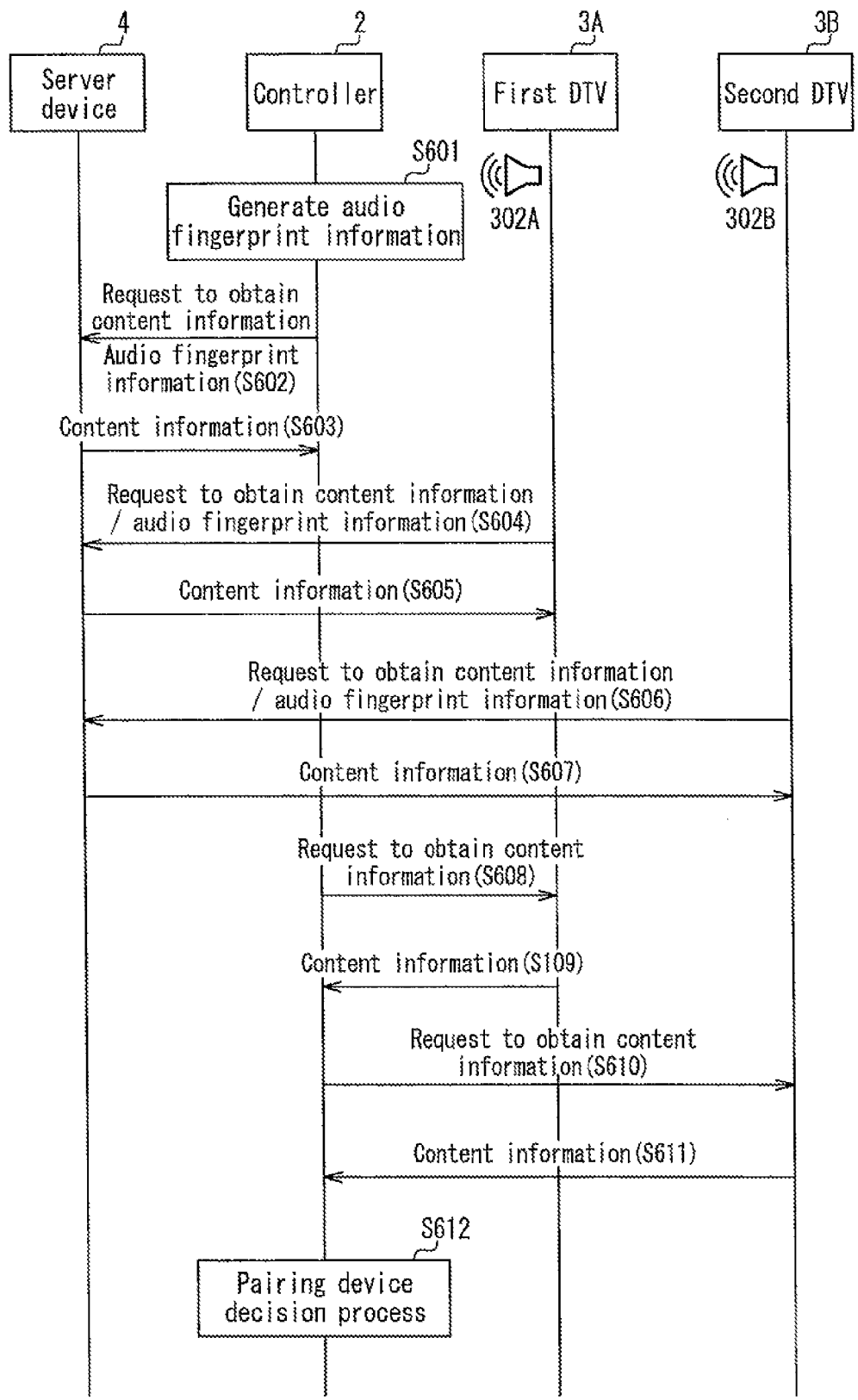
FIG. 7 is a diagram showing a communication sequence of the pairing system of Embodiment 1.

For example, as shown in FIG. 7, it is also possible that the first DTV 3A and the second DTV 3B generate audio fingerprint information from the audio that is output from a speaker that is included in their own video output portion 302, and using this generated audio fingerprint information, inquire the content information from the server device 4 (see S604 to S607 in FIG. 7). In this case, the controller 2 sends the request to obtain content information to each of the first DTV 3A and the second DTV 3B (S608, S610), and receives the content information in response (S609, S611). It should be noted that in FIG. 7, the processing content of the steps S601, S602, S603 and S612 is the same as the processing content of the steps S101, S102, S103 and S112 in FIG. 5.

Figure 8:
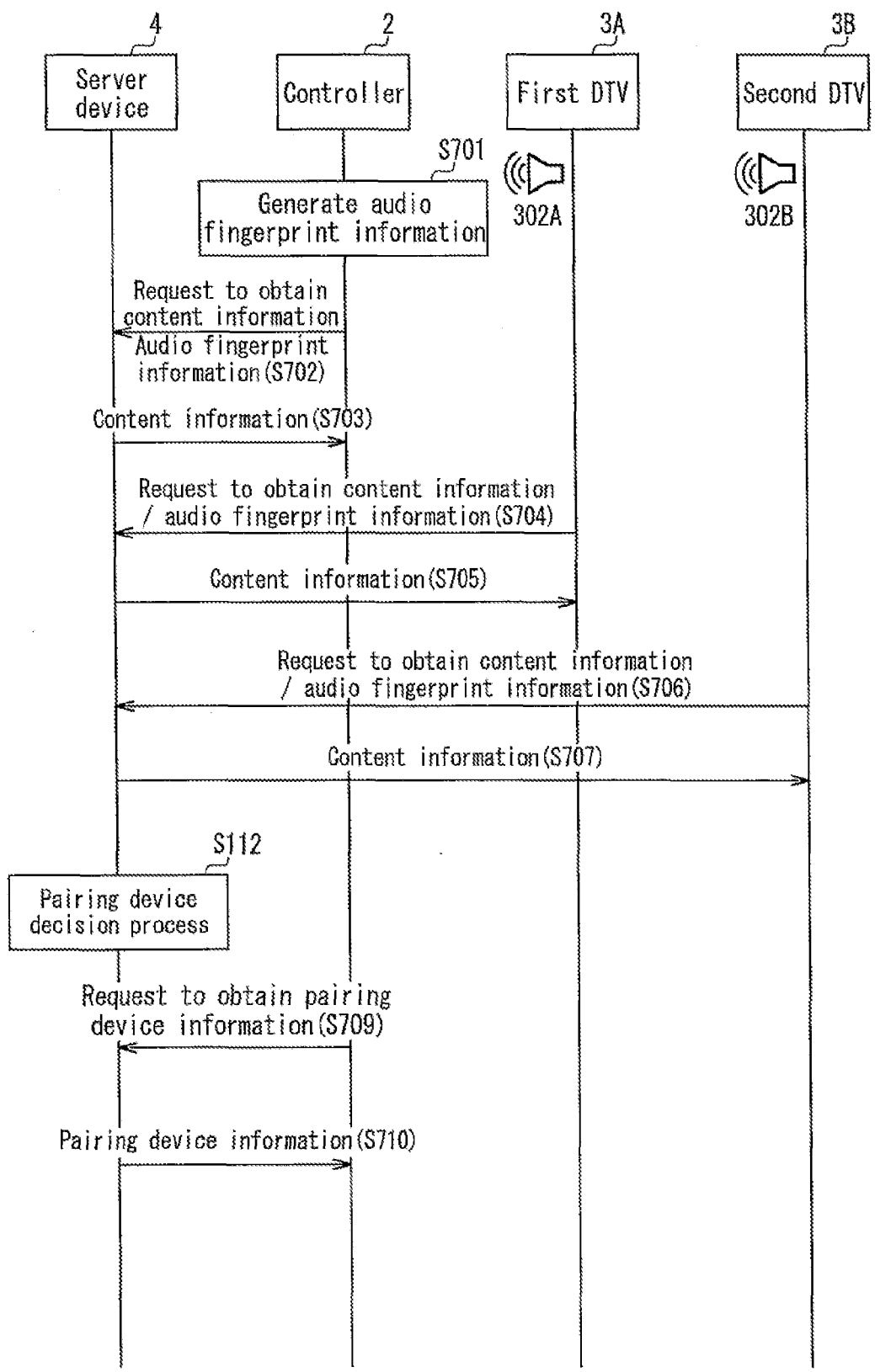
FIG. 8 is a diagram showing a communication sequence of the pairing system of Embodiment 1.

As shown in FIG. 8, it is also possible that the server device 4 that has obtained audio fingerprint information respectively from the controller 2, the first DTV 3A and the second DTV 3B performs pairing between the controller 2 and the DTV (first DTV 3A) that has sent audio fingerprint information corresponding to the content information matching the content information corresponding to the audio fingerprint information of the controller 2. In this case, after the pairing device has been decided by the server device 4 (S708), the controller 2 sends a request to obtain pairing device information to the server device 4 (S709). Next, the controller 2 receives a response including pairing device information from the server device 4 (S710). Thus, the controller 2 identifies the device (first DTV 3A) it is to be paired with. Note that in FIG. 8, the processing content of the processes S701, S702 and S703 is equivalent to the processing content of the processes S101, S102 and S103 shown in FIG. 5.

Moreover; the controller 2, the first DTV 3A and the second DTV 3B may send to the server device 4 their audio fingerprint information along with device identification information of the device that has generated the audio fingerprint information, and the server device 4 may hold content information that corresponds to the device identification information and the audio fingerprint information that has been sent. Furthermore, when the device identification information and the audio fingerprint information has been sent from the controller 2, the first DTV 3A and the second DTV 3B, the server device 4 may preferentially carry out the comparison with audio fingerprint information included in the content database that matches the held content information. Thus, it becomes possible to quickly detect whether there is a change in the content information input into the controller 2 or the content information displayed respectively by the first DTV 3A and the second DTV 3B. Consequently, in a state in which the controller 2 is paired with the first DTV 3A, if there is a change in the content that is played on the first DTV 3A, it is possible to display relevant information tracking this change in content on the tablet terminal, without performing another pairing operation. Moreover, it becomes possible to reduce the server load when detecting whether there is a change in content. More specifically, this becomes possible by letting the controller 2, the first DTV 3A and the second DTV 3B periodically send a request to obtain content information to the server device 4 after the pairing has finished, and upon obtaining the content information carrying out the above-described comparison preference processing.

Embodiment 2

[1. System Configuration]

Referring to FIGS. 9 to 13, the following is an explanation of a second embodiment of the present invention.

Figure 9:
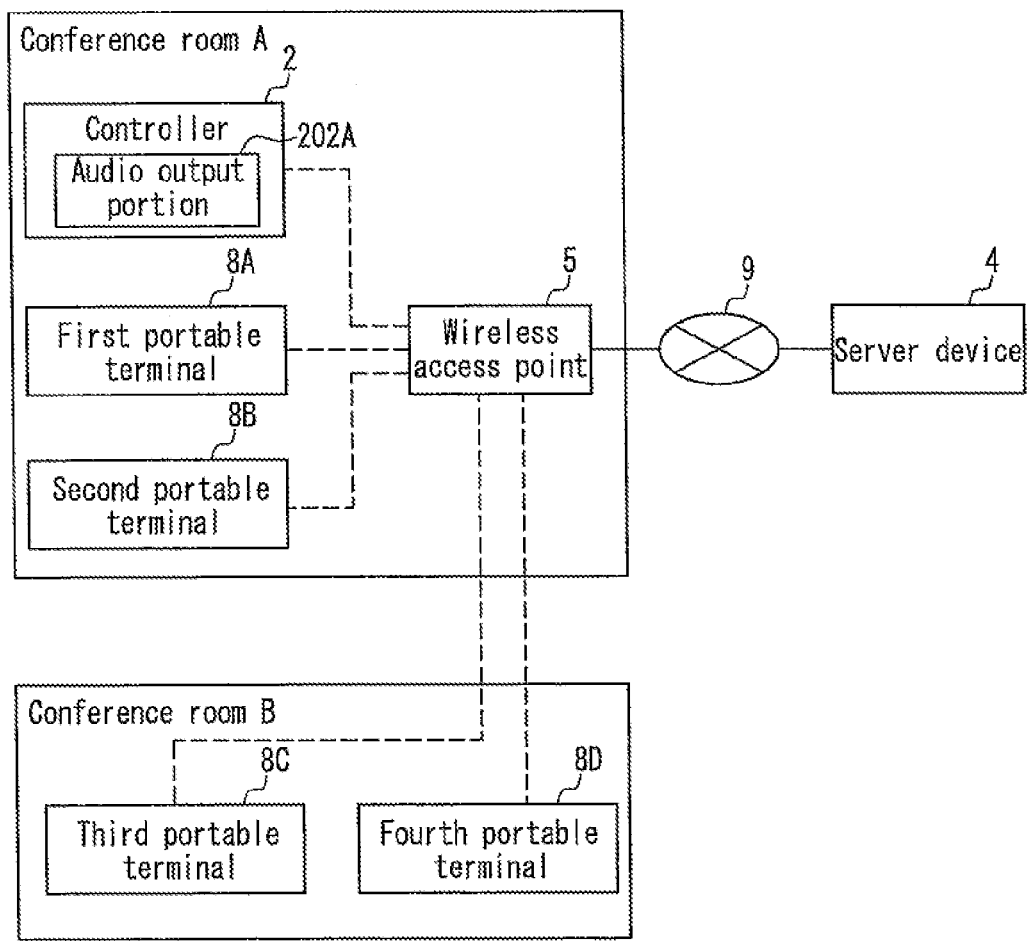
FIG. 9 is a diagram showing a configuration example of a pairing system according to Embodiment 2.
Figure 10:
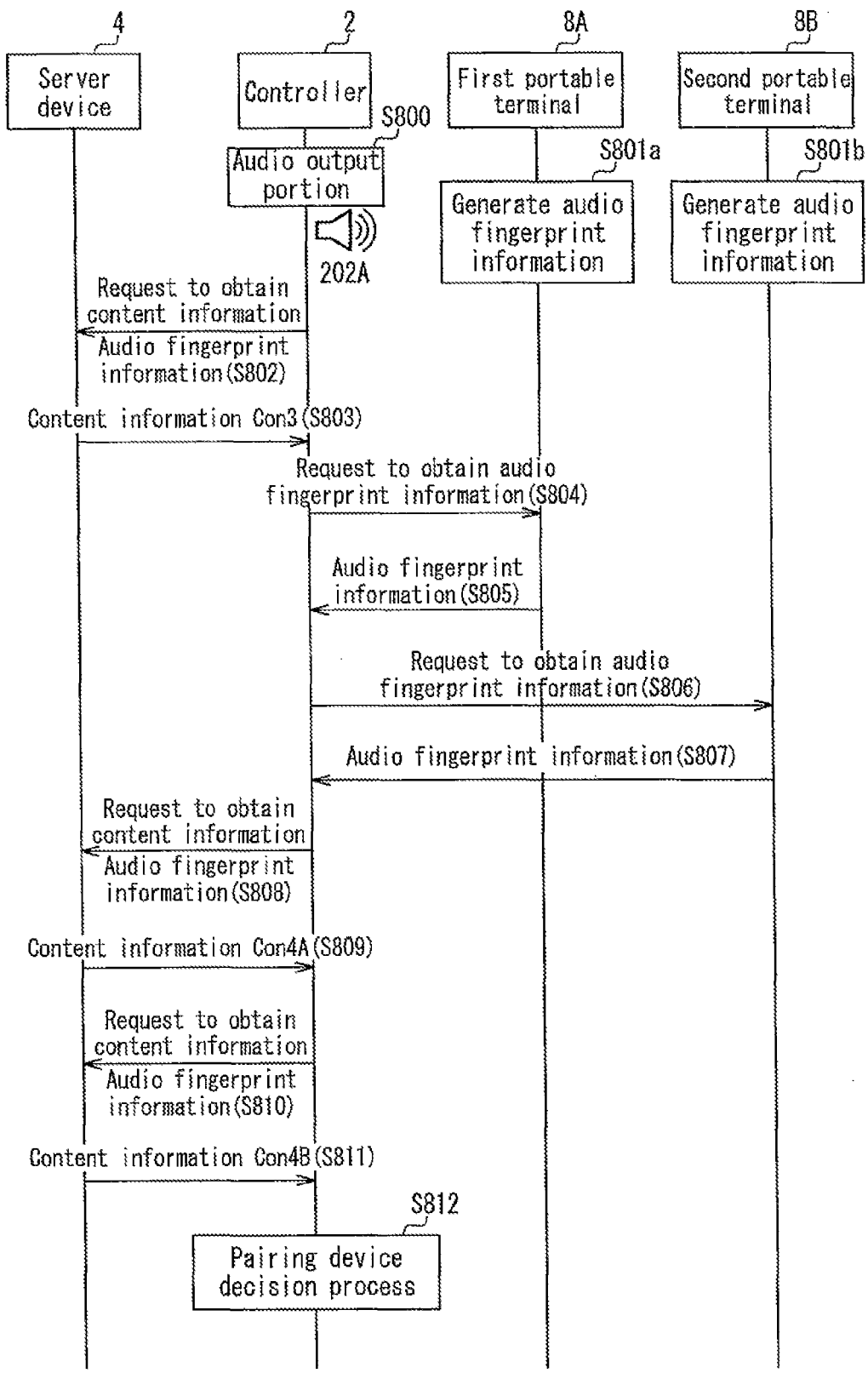
FIG. 10 is a diagram showing a communication sequence of the pairing system of Embodiment 2.

FIGS. 9 and 10 are block diagrams showing a system configuration according to Embodiment 2. In FIG. 10, structural elements that are equivalent to structural elements of the system configuration shown in FIG. 1 are given the same reference numerals and their further explanation has been omitted. The system shown in FIG. 10 is applied to a network in a plurality of conference rooms (conference room A, conference room B) in an office. A controller 2, a wireless access point 5, a first portable terminal 8A and a second portable terminal 8B are arranged in the conference room A. A third portable terminal 8C and a fourth portable terminal 8D are arranged in the conference mom B. The controller 2, the first portable terminal 8A, the second portable terminal 8B, the third portable terminal 8C, and the fourth portable terminal 8D can be moved by the user to any desired location.

In conference room A, the plurality of portable terminals 8A and 8B, and the wireless access point 5, which has a wireless function as well as a network hub function, are network-connected by a wireless communication line.

The controller 2 is arranged in the conference room A and is network-connected to the wireless access point 5 by a wireless communication line. Moreover, the controller 2 includes an audio output portion 202A. The audio output portion 202A may be configured by a speaker, for example.

The plurality of portable terminals 8C and 8D are arranged in the conference room B. The controller 2 and the portable terminals 8C and 8D are wirelessly Connected to the wireless access point 5, constituting a network. That is to say the controller 2, the portable terminals 8A and 8B, and the portable terminals 8C and 8D are connected to the same network, and constitute a IAN (Local Area Network).

The wireless access point 5 is connected to the Internet 9, and is in a state in which it can communicate with a server device 4 on the Internet 9.

The configuration of the controller 2, the portable terminals 8A, 8B, 8C and 8D is the same as the configuration shown in FIG. 2 of Embodiment 1, so that further detailed explanations are omitted.

[2. Communication Sequence]

FIG. 10 illustrates a communication sequence of a pairing system of Embodiment 2.

Referring to FIG. 10, the following is an explanation of the communication sequence when deciding on a pairing device in accordance with the present embodiment. It should be noted that FIG. 10 shows only the sequence for the first portable terminal 8A and the second portable terminal 8B out of all portable devices, but also for the third portable terminal 8C and the fourth portable terminal 8D the same sequence as shown in FIG. 10 can be executed.

When the controller 2 and the portable terminals 8A to 8D receive an instruction to start a predetermined application program from a user, then they execute a predetermined application program that is already installed on them. The controller 2 sends to the wireless access point 5 a request for searching portable terminals connected to the LAN. The wireless access point 5 sends the search request received from the controller 2 to the portable terminals 8A to 8D. The portable terminals 8A to 8D output a response signal as a response to the received search request. The response signal is sent via the wireless access point 5 to the controller 2. When the controller 2 receives the response signal sent from the portable terminals 8A to 8D, a request to obtain detailed information on the portable terminal detected based on this response signal is sent via the wireless access point 5 to the portable terminals 8A to 8D. In response to the received request to obtain detailed information, the portable terminals 8A to 8D send detailed information on themselves via the wireless access point 5 to the controller 2. The controller 2 receives the detailed information sent from the portable terminals 8A to 8D. If a plurality of portable terminals are connected to the network, then the controller 2 obtains the detailed information concerning each of these portable terminals 8A to 8D.

Next, the controller 2 outputs audio from the audio output portion 202A. More specifically, the controller 2 outputs suitable audio from a speaker in the audio output portion 202A (S800).

The portable terminals 8A to 8D put a microphone in their respective audio input portion 206 into a state in which it can collect audio. When the respective audio input portions 206 (microphones) of the portable terminals 8A to 8D are in a state in which they can collect audio, they obtain audio from the surroundings of the portable terminals 8A to 8D. The portable terminals 8A to 8D generate audio fingerprint information from the audio obtained by the audio input portion 206 (S801).

In the present embodiment, as shown in FIG. 9, the first portable terminal 8A and the second portable terminal 8B are arranged in the conference room A, in which also the controller 2 is arranged, so that the audio input portions 206 of the first portable terminal 8A and the second portable terminal 8B can obtain audio that is output from the audio output portion 202A of the controller 2. The third portable terminal 8C and the fourth portable terminal 8D are arranged in the conference mom B, so that it is difficult for them to obtain audio that is output from the audio output portion 202A of the controller 2. Consequently, in the present embodiment, the first portable terminal 8A and the second portable terminal 8B generate audio fingerprint information of audio that is output from the audio output portion 202A of the controller 2.

The controller 2 sends a request to obtain content information including the audio fingerprint information generated from the audio that is output from the video/audio output portion 202 to the server device 4 (S802).

The server device 4 compares the audio fingerprint information contained in the received request to obtain content information with the audio fingerprint information contained in a content database of the server device itself, and extracts the content information corresponding to the request to obtain content information from the content database. Next, as a response to the request to obtain content information sent by the controller 2, the server device 4 sends the content information Con3 back to the controller 2 (S803).

Next, the controller 2 sends a request to obtain audio fingerprint information to the portable terminals 8A to 8D connected to the LAN (S804, S806).

After the portable terminals 8A to 8D have received the request to obtain audio fingerprint information, the generated audio fingerprint information is sent to the controller 2 in response to the request to obtain audio fingerprint information (S805, S807).

After the controller 2 has obtained the audio fingerprint information from the portable terminals 8A to 8D, it sends a request to obtain content information including the obtained audio fingerprint information to the server device 4 (S808, S810).

The server device 4 compares the audio fingerprint information included in the received request to obtain content information with the audio fingerprint information included in the content database of the server device itself, and extracts, from the content database, the content information corresponding to the request to obtain content information. Next, in response to the request to obtain content information, the server device 4 sends the content information Con4A and Con4B back to the controller 2 (S809, S811).

Next, the controller 2 compares the content information Con3 with the content information Con4A and Con4B. The controller 2 carries out pairing with the device that has sent audio fingerprint information corresponding to the content information matching the content information Con3 (S812). In the case of this embodiment, the audio input portions 206 of the first portable terminal 8A and the second portable terminal 8B can obtain the audio that is output from the audio output portion 202A of the controller 2, which is in the same conference room. That is to say, the content information Con3 matches the content information Con4A and 4B. Consequently, the controller 2 is paired with the first portable terminal 8A, which has sent the content information Con4A, and the second portable terminal 8B, which has sent the content information Con4B.

[3. Process Flow for Deciding the Reproducing Device]

Figure 11:
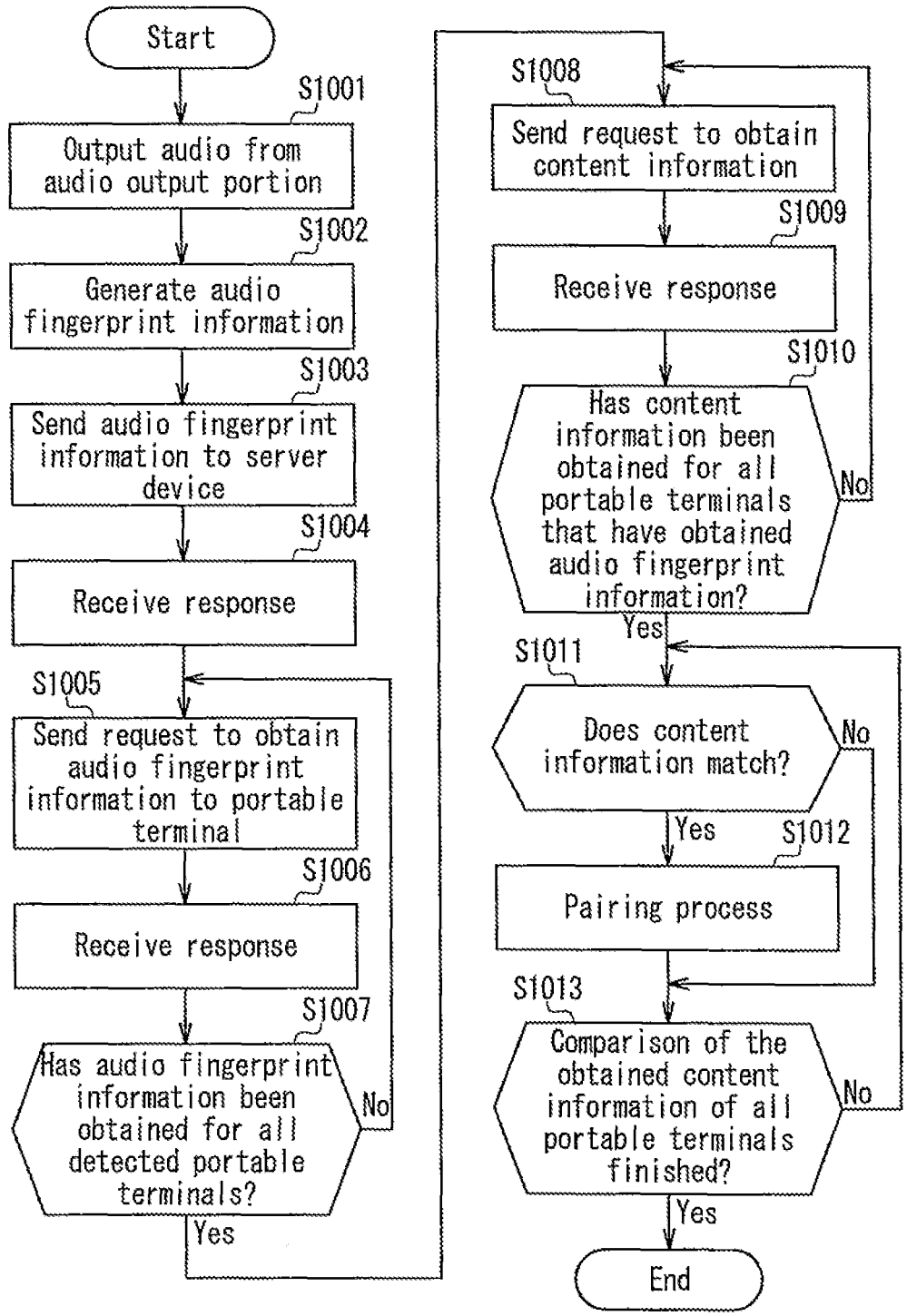
FIG. 11 is a diagram showing the processing flow of a controller according to Embodiment 2.

FIG. 11 shows the process flow when the controller 2 decides the pairing with a nearby portable terminal, from among a plurality of portable terminals connected to a network.

When the controller 2 receives from the user an instruction to activate a predetermined application, it executes a predetermined application program that is preinstalled on the controller, and sends to the wireless access point 5 a request for searching a portable terminal connected to the LAN. The wireless access point 5 sends the search request from the controller 2 to the portable terminals 8A to 8D. The portable terminals 8A to 8D output a response signal in response to the received search signal. The response signal is sent via the wireless access point 5, for example, to the controller 2. When the controller 2 receives the response signal from the portable terminals 8A to 8D, it sends a request for obtaining detailed information on the portable terminals 8A to 8D detected based on this response signal to the portable terminals 8A to 8D. In response to the received request to obtain detailed information, the portable terminals 8A to 8D send detailed information about themselves via the wireless access point 5 to the controller 2. The controller 2 receives the detailed information sent from the portable terminals 8A to 8D. If a plurality of portable terminals are connected to the network, then the controller 2 receives the detailed information from each of the portable terminals 8A to 8D.

The controller 2 outputs audio from the speaker of the audio output portion 202A (S1001).

The portable terminals 8A to 8D activate the microphones include in their respective audio input portions 206 and collect audio from their surroundings. The portable terminals 8A to 8D generate audio fingerprint information from the audio that is output from the audio output portion 202A of the controller 2 (S1002).

Next, the controller 2 sends the request to obtain content information including the generated audio fingerprint information to the server device 4 (S1003).

Having received the request to obtain content information, the server device 4 sends content information to the controller 2. The controller 2 receives the content information sent from the server device 4 (S1004).

Next, the controller 2 sends a request to obtain audio fingerprint information to the portable terminals 8A to 8D connected to the LAN (S1005).

Having received the request to obtain audio fingerprint information, the portable terminals 8A to 8D send audio fingerprint information to the controller 2. The controller 2 receives the audio fingerprint information sent from the portable terminals 8A to 8D (S1006).

The controller 2 obtains audio fingerprint information for all detected portable terminals (S1007).

After the controller 2 has obtained the audio fingerprint information of the portable terminals, it sends a request to obtain content information including the obtained audio fingerprint information to the server device 4 (S1008).

Having received the request to obtain content information, the server device 4 sends the content information to the controller 2. The controller 2 receives the content information sent from the server device 4 (S1009).

The controller 2 obtains the corresponding content information for all portable terminals that have obtained audio fingerprint information (S1010).

Next, the controller 2 compares the content information Con3 corresponding to the audio fingerprint information generated from the audio information that has been output by its own video/audio output portion with the content information Con4A and Con4B corresponding to the audio fingerprint information obtained from the portable terminals connected to the LAN (S1011). As a result of this comparison, the controller 2 carries out pairing with the device that has sent audio fingerprint information corresponding to content information matching the content information Con3 (S1012). Thus, the controller 2 carries out pairing with a portable terminal nearby.

When the controller 2 has finished the process of comparing the obtained content information of all DTVs, the pairing process is finished (S1013).

Through the above-described series of processes, the controller 2 is able to automatically pair itself with a portable terminal, from among a plurality of portable terminals connected to a network, that is within a distance at which it can be reached by audio from the controller 2. Consequently, depending on the position of the operated controller 2, the user does not need to select by hand a nearby portable terminal.

It should be noted that in the present embodiment, the controller 2 obtains audio fingerprint information of the portable terminals, and using the obtained audio fingerprint information, it obtains the content information corresponding to the audio fingerprint information from the server device 4, but there is no limitation to this.

Figure 12:
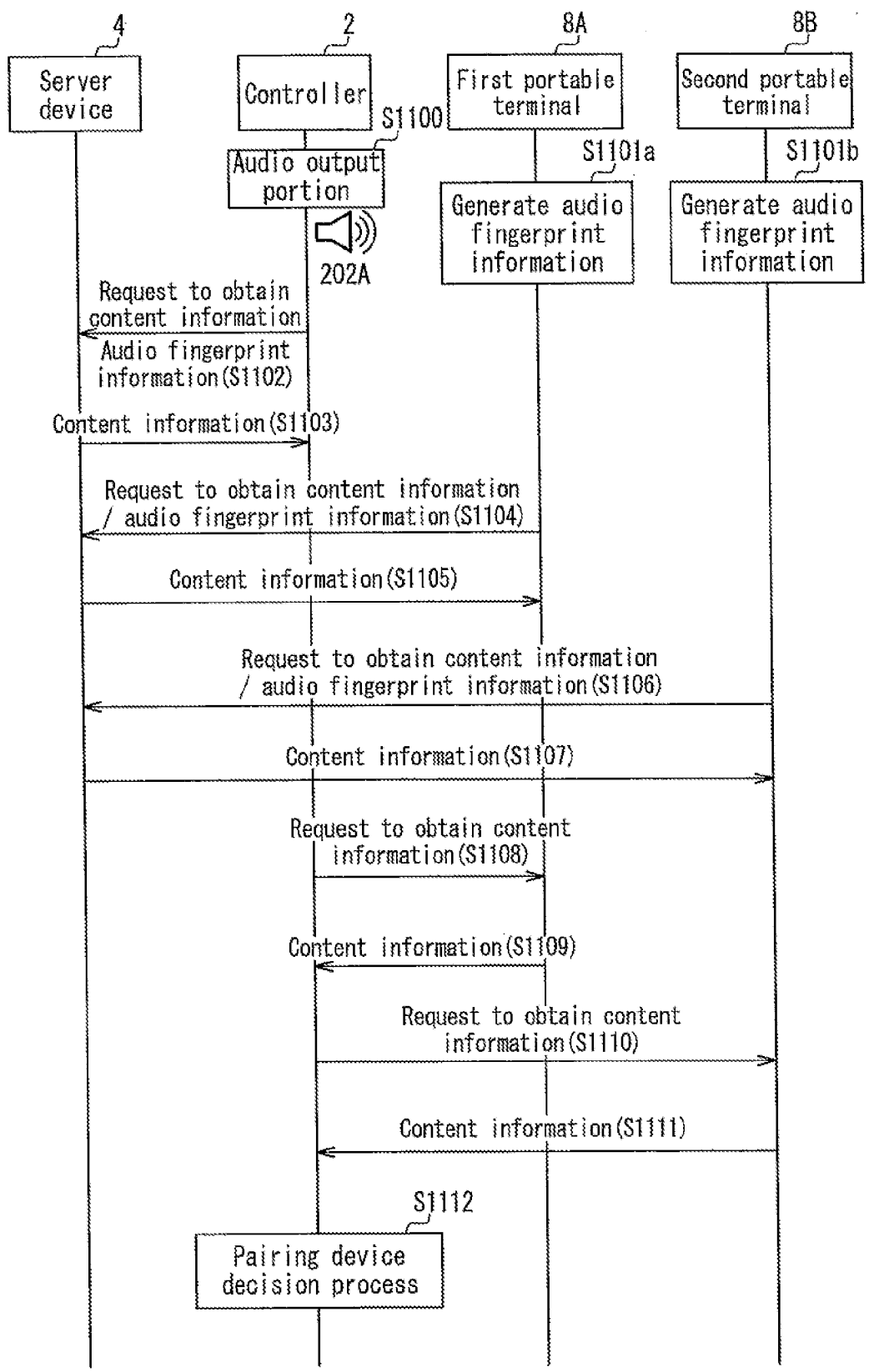
FIG. 12 is a diagram showing a communication sequence of the pairing system of Embodiment 2.

For example, as shown in FIG. 12, it is also possible that the portable terminals 8A and 8B each generate audio fingerprint information from the audio that is input from their own audio input portions 206, and using this generated audio fingerprint information, inquire the content information from the server device 4 (see S1104 to S1107 in FIG. 12). In this case, the controller 2 sends the request to obtain content information to each of the portable terminals 8A and 8B (S1108, S1110), and receives the content information in response (S1109, S1111). It should be noted that in FIG. 12, the processes S1100, S1101, S1102 and S1103 are equivalent to the processing content of the processes S800, S801, S802 and S803 in FIG. 10.

Figure 13:
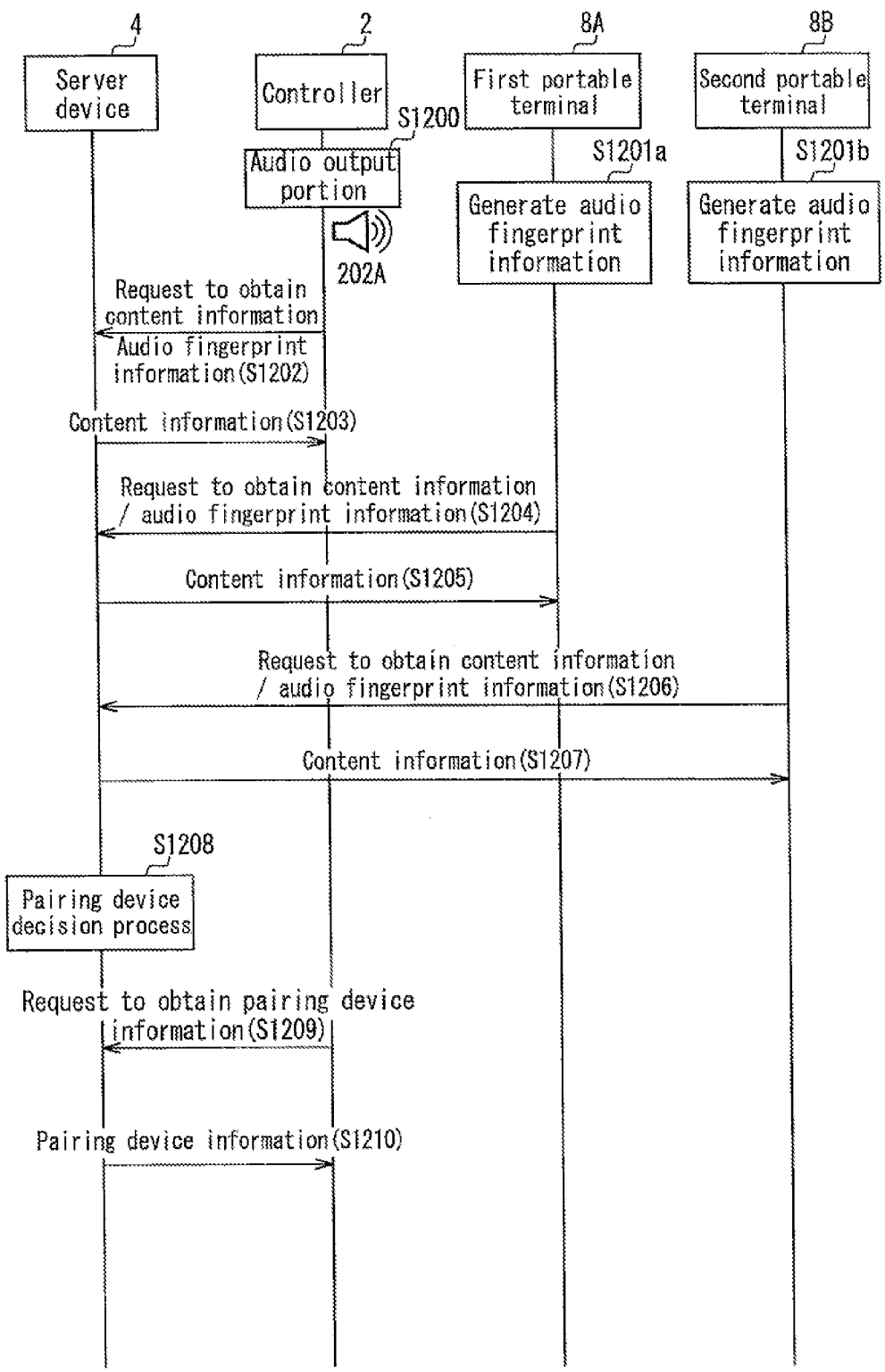
FIG. 13 is a diagram showing a communication sequence of the pairing system of Embodiment 2.
Figure 14:
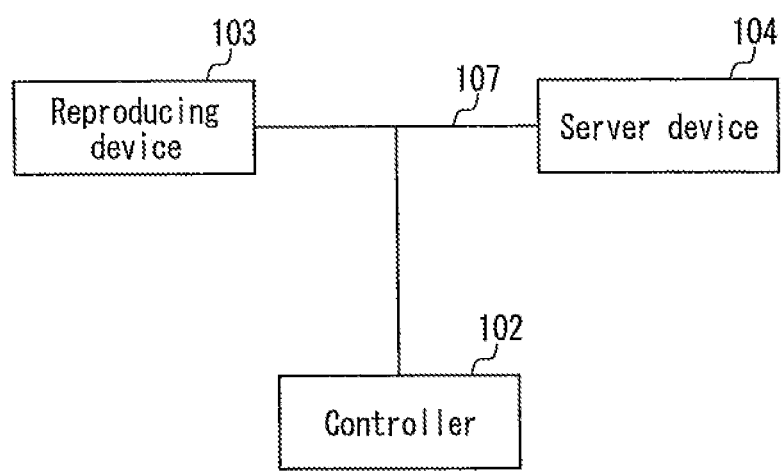
FIG. 14 is a diagram showing a configuration example of a conventional server device, reproducing device and controller.
Figure 15:
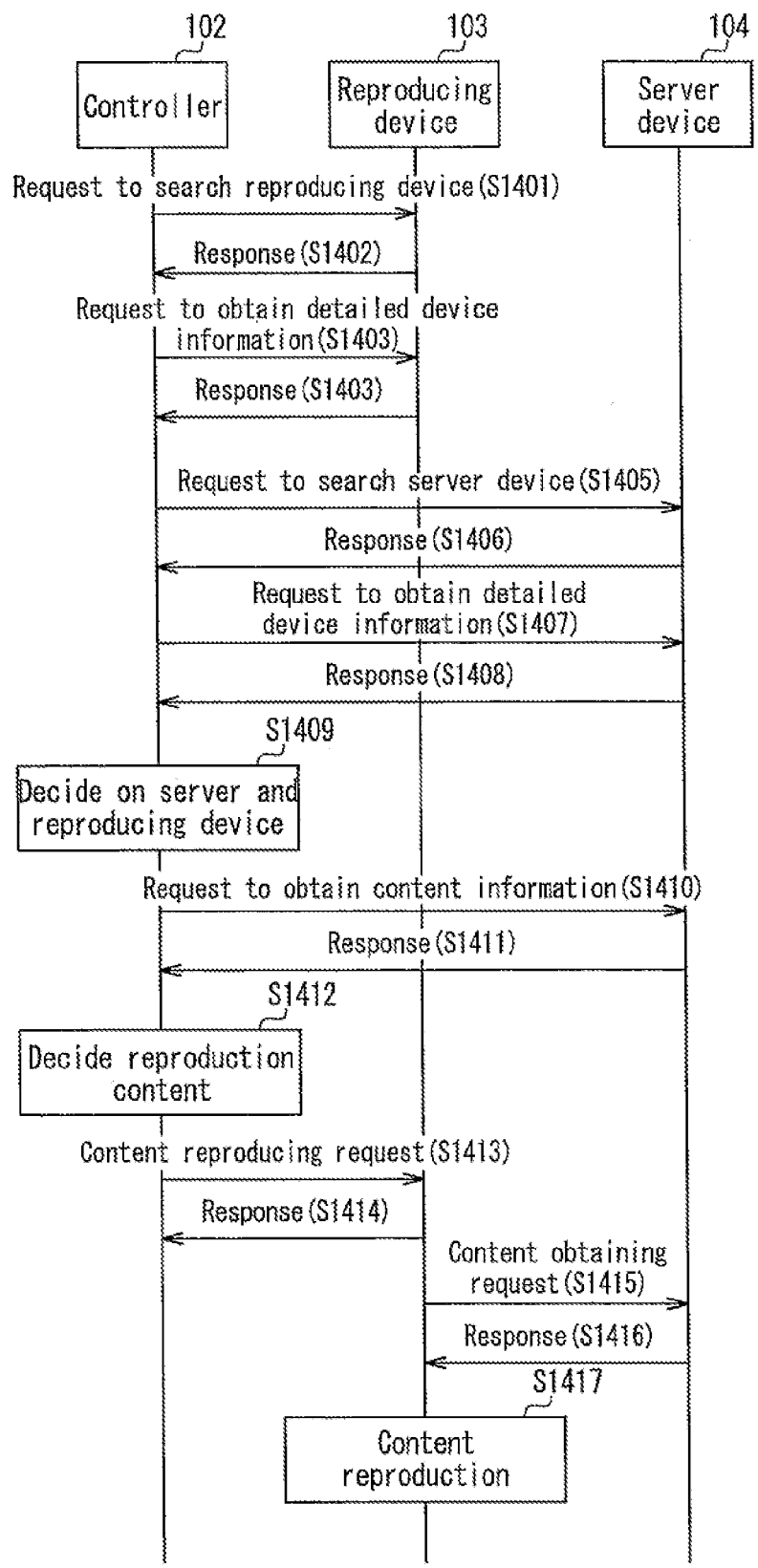
FIG. 15 is a diagram showing a communication sequence of a conventional system in which content on a server device is displayed via a controller on a reproducing device.

Moreover, as shown in FIG. 13, it is also possible that the server device 4 that has obtained audio fingerprint information respectively from the controller 2, the first portable terminal 8A and the second portable terminal 8B performs pairing between the controller 2 and the portable terminals 8A and 8B that have sent audio fingerprint information corresponding to the content information matching the content information corresponding to the audio fingerprint information of the controller 2 (S1208). In this case, the controller 2 sends a pairing device information obtaining request to the server device 4 (S1209), and receives a response including pairing device information from the server device 4 (S1210), thus identifying the pairing device. Note that in FIG. 13, the processes S1200, S1201, S1202 and S1203 are equivalent to the processing content of the processes S800, S801, S802 and S803 shown in FIG. 10.

It should be noted that the server device 4 is an example of a content identification server. The first DTV 3A and the second DTV 3B are examples of devices. The controller 2, the first portable terminal 8A, the second portable terminal 8B, the third portable terminal 8C, and the fourth portable terminal 8D are examples of portable terminals. The audio input portion 206 is an example of an audio input portion. The control portion 201 is an example of an audio fingerprint information generation portion and a pairing device deciding portion. The communication portion 205 is an example of a communication portion. The communication portion 405 is an example of a subordinate communication portion. The control portion 401 is an example of a content identifying portion and a subordinate pairing device deciding portion.

The disclosure of this application can be used in systems that play content on a server device, such as a digital video recorder (DVR) at home, via a controller on a reproducing device, such as a digital television (DTV) having a so-called "renderer function", as well as to a portable controller, a portable terminal and a reproducing device, such as a DTV, that constitute a part of this system.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A pairing system comprising:
   a content identification server that outputs content information in response to an input of audio fingerprint information;
   a plurality of devices capable of sending audio fingerprint information of audio that can be output from the devices; and
   a portable terminal comprising:
      an audio input portion into which audio can be input from outside;
      an audio fingerprint information generation portion that generates audio fingerprint information of audio that has been input into the audio input portion;
      a communication portion that, upon sending to the content identification server the audio fingerprint information generated by the audio fingerprint information generation portion, receives first content information, and upon receiving audio fingerprint information from each of the plurality of devices, and send the received audio fingerprint information to the content identification server, receives content information corresponding to the respective audio fingerprint information received from the plurality of devices, and
      a pairing device deciding portion that establishes a pairing with a device that has sent audio fingerprint information corresponding to content information matching the first content information, out of the received content information.

2. A pairing system according to claim 1,
   wherein the portable terminal and the plurality of devices also send device identification information of the device that has generated the audio fingerprint information, when sending the audio fingerprint information to the content identification server; and the content identification server holds content information corresponding to the device identification information and the audio fingerprint information, and preferentially carries out a comparison with audio fingerprint information matching the held content information and included in a content database, when the device identification information and the audio fingerprint information has been sent from the portable terminal or the plurality of devices.

3. A pairing system comprising:

a content identification server that outputs content information in response to an input of audio fingerprint information;

a plurality of devices capable of sending content information of content that is currently being played; and a portable terminal comprising:
an audio input portion into which audio can be input from outside;
an audio fingerprint information generation portion that generates audio fingerprint information of audio that has been input into the audio input portion;
a communication portion that, upon sending to the content identification server the audio fingerprint information generated by the audio fingerprint information generation portion, receives first content information, and receives content information corresponding to the respective audio fingerprint information received from the plurality of devices; and
a pairing device deciding portion that establishes a pairing with a device that has sent content information matching the first content information, out of the received content information.

4. A pairing system according to claim 3, wherein the portable terminal and the plurality of devices also send device identification information of the device that has generated the audio fingerprint information, when sending the audio fingerprint information to the content identification server; and the content identification server holds content information corresponding to the device identification information and the audio fingerprint information, and preferentially carries out a comparison with audio fingerprint information matching the held content information and included in a content database, when the device identification information and the audio fingerprint information has been sent from the portable terminal or the plurality of devices.

5. A pairing system comprising:

a content identification server that outputs content information in response to an input of audio fingerprint information;

a plurality of devices capable of sending audio fingerprint information of audio that can be input into the devices; and a portable terminal comprising:
an audio output portion capable of outputting audio to the outside;
an audio fingerprint information generation portion that generates audio fingerprint information of audio that has been output by the audio output portion;
a communication portion that, upon sending to the content identification server the audio fingerprint information generated by the audio fingerprint information generation portion, receives first content information, and upon receiving audio fingerprint information from each of the plurality of devices and sending the received audio fingerprint information to the content identification server, receives content information corresponding to the respective audio fingerprint information received from the plurality of devices, and
a pairing device deciding portion that establishes a pairing with a device that has sent audio fingerprint information corresponding to content information matching the first content information, out of the content information.

6. A pairing system comprising:

a content identification server that outputs content information in response to an input of audio fingerprint information;

a plurality of devices capable of sending content information corresponding to audio that can be input into the devices; and a portable terminal comprising:
an audio output portion capable of outputting audio to the outside;
an audio fingerprint information generation portion that generates audio fingerprint information of audio that has been output by the audio output portion;
a communication portion that, upon sending to the content identification server the audio fingerprint information generated by the audio fingerprint information generation portion, receives first content information, and receives content information corresponding to the respective audio fingerprint information received from the plurality of devices; and
a pairing device deciding portion that establishes a pairing with a device that has sent content information matching the first content information, out of the content information.

7. A portable terminal that can be connected to a content identification server that outputs content information in response to an input of audio fingerprint information and to a plurality of devices that are capable of sending audio fingerprint information of audio that can be output from the devices, the portable terminal comprising:

an audio input portion into which audio can be input from outside;

an audio fingerprint information generation portion that generates audio fingerprint information of audio that has been input into the audio input portion;

a communication portion that, upon sending to the content identification server the audio fingerprint information generated by the audio fingerprint information generation portion, receives first content information, and upon receiving audio fingerprint information from each of the plurality of devices and sending the received audio fingerprint information to the content identification server, receives content information corresponding to the respective audio fingerprint information received from the plurality of devices, and a pairing device deciding portion that establishes a pairing with a device that has sent audio fingerprint information corresponding to content information matching the first content information, out of the received content information.

8. The portable terminal according to claim 7, also sending device identification information of the device that has generated the audio fingerprint information, when the portable terminal sends the audio fingerprint information to the content identification server.

9. The portable terminal according to claim 7, wherein the communication portion comprises:
a first communication portion that is capable of communicating with the content identification server; and
a second communication portion that is capable of communicating with the plurality of devices.

10. A portable terminal that can be connected to a content identification server that outputs content information in response to an input of audio fingerprint information and to a plurality of devices capable of sending content information of content that is currently being played, the portable terminal comprising:
an audio input portion into which audio can be input from outside;
an audio fingerprint information generation portion that generates audio fingerprint information of audio that has been input into the audio input portion;
a communication portion that, upon sending to the content identification server the audio fingerprint information generated by the audio fingerprint information generation portion, receives first content information, and receives content information corresponding to the respective audio fingerprint information received from the plurality of devices; and
a pairing device deciding portion that establishes a pairing with a device that has sent content information matching the first content information, out of the received content information.

11. The portable terminal according to claim 10, also sending device identification information of the device that has generated the audio fingerprint information, when the portable terminal sends the audio fingerprint information to the content identification server.

12. The portable terminal according to claim 10, wherein the communication portion comprises:
a first communication portion that is capable of communicating with the content identification server; and
a second communication portion that is capable of communicating with the plurality of devices.

13. A portable terminal that can be connected to a content identification server that outputs content information in response to an input of audio fingerprint information and to a plurality of devices that are capable of sending audio fingerprint information of audio that can be input into the devices, the portable terminal comprising:
an audio output portion capable of outputting audio to the outside;
an audio fingerprint information generation portion that generates audio fingerprint information of audio that has been output by the audio output portion;
a communication portion that, upon sending to the content identification server the audio fingerprint information generated by the audio fingerprint information generation portion, receives first content information, and upon receiving audio fingerprint information from each of the plurality of devices and sending the received audio fingerprint information to the content identification server, receives content information corresponding to the respective audio fingerprint information received from the plurality of devices, and
a pairing device deciding portion that establishes a pairing with a device that has sent audio fingerprint information corresponding to content information matching the first content information, out of the content information.

14. The portable terminal according to claim 13, wherein the communication portion comprises:
a first communication portion that is capable of communicating with the content identification server; and
a second communication portion that is capable of communicating with the plurality of devices.

15. A portable terminal that can be connected to a content identification server that outputs content information in response to an input of audio fingerprint information and to a plurality of devices capable of sending content information corresponding to content that can be input into the devices, the portable terminal comprising:
an audio output portion capable of outputting audio to the outside;
an audio fingerprint information generation portion that generates audio fingerprint information of audio that has been output by the audio output portion;
a communication portion that, upon sending to the content identification server the audio fingerprint information generated by the audio fingerprint information generation portion, receives first content information, and receives content information corresponding to the respective audio fingerprint information received from the plurality of devices; and
a pairing device deciding portion that establishes a pairing with a device that has sent content information matching the first content information, out of the content information.

16. The portable terminal according to claim 15, wherein the communication portion comprises:
a first communication portion that is capable of communicating with the content identification server; and
a second communication portion that is capable of communicating with the plurality of devices.

* * * * *